United States Patent
Nose et al.

(10) Patent No.: US 8,398,075 B2
(45) Date of Patent: Mar. 19, 2013

(54) AUTO DOCUMENT FEEDER AND A DOCUMENT READER WITH THE AUTO DOCUMENT FEEDER

(75) Inventors: Yoshitaka Nose, Kyoto (JP); Toshihiro Kawamura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 15 days.

(21) Appl. No.: 13/079,145

(22) Filed: Apr. 4, 2011

(65) Prior Publication Data

US 2011/0254216 A1    Oct. 20, 2011

(30) Foreign Application Priority Data

Apr. 19, 2010    (JP) ................................ 2010-096484

(51) Int. Cl.
*B65H 29/70* (2006.01)

(52) U.S. Cl. ......... 271/186; 271/184; 271/225; 399/364

(58) Field of Classification Search .................. 271/225, 271/184, 186; 399/364, 374

See application file for complete search history.

(56) References Cited

U.S. PATENT DOCUMENTS

| | | | |
|---|---|---|---|
| 5,597,153 A * | 1/1997 | Maruyama et al. ............ | 271/4.1 |
| 5,907,759 A | 5/1999 | Yashiro | |
| 6,032,941 A * | 3/2000 | Endo ............................ | 271/3.19 |
| 6,393,251 B2 * | 5/2002 | Kono ............................ | 399/370 |
| 6,746,013 B2 * | 6/2004 | Shih ............................. | 271/186 |
| 7,573,619 B2 * | 8/2009 | Tsai et al. ..................... | 358/498 |
| 7,717,423 B2 * | 5/2010 | Litman et al. ................. | 271/273 |
| 7,802,786 B2 * | 9/2010 | Tsai et al. ..................... | 271/186 |
| 7,832,724 B2 * | 11/2010 | Lo et al. ........................ | 271/186 |
| 8,177,225 B2 * | 5/2012 | Tokutsu ........................ | 271/186 |
| 2002/0158404 A1 * | 10/2002 | Carter et al. .................. | 271/186 |
| 2007/0212140 A1 * | 9/2007 | Xu et al. ....................... | 399/367 |
| 2008/0031667 A1 * | 2/2008 | Tsai et al. ..................... | 399/374 |
| 2008/0043294 A1 * | 2/2008 | Su et al. ....................... | 358/474 |
| 2008/0067736 A1 * | 3/2008 | Tsai et al. ..................... | 271/186 |
| 2008/0179822 A1 * | 7/2008 | Tu ................................. | 271/186 |
| 2009/0085280 A1 * | 4/2009 | Litman et al. ................. | 271/186 |
| 2010/0098472 A1 * | 4/2010 | Kawamura et al. ........... | 399/374 |

FOREIGN PATENT DOCUMENTS

| | | |
|---|---|---|
| JP | 04-190368 A | 7/1992 |
| JP | 06-247642 A | 9/1994 |
| JP | 08-286436 A | 11/1996 |
| JP | 09-307701 A | 11/1997 |

* cited by examiner

*Primary Examiner* — Kaitlin Joerger
(74) *Attorney, Agent, or Firm* — Keating & Bennett, LLP

(57) ABSTRACT

An auto document feeder includes a lead path, a first reverse path, a second reverse path, and a both surfaces eject path. The lead path guides a document from a left side to a right side of a read position. The first reverse path and the second reverse path are connected to the lead path, and reverse the document to guide the document from the right side to the left side of the read position. A both surfaces eject path is connected to the first reverse path and the second reverse path and guides the document whose image information of a second surface has been read so as to eject further to the right side than the read position. Further, the lead path includes a lead curve path which protrudes to the left side and is arranged more to the left side than the read position. A shared curve path shared by the lead path and the both surfaces eject path includes a portion between the read position and a portion in which the lead curve path protrudes the most.

19 Claims, 10 Drawing Sheets

AUTO DOCUMENT FEEDER AND A DOCUMENT READER WITH THE AUTO DOCUMENT FEEDER

CROSS-REFERENCE TO RELATED APPLICATIONS

This application claims priority under 35 U.S.C. 119 to Japanese Patent Application No. 2010-096484, filed on Apr. 19, 2010, which application is hereby incorporated by reference in its entirety.

BACKGROUND OF THE INVENTION

1. Field of the Invention

The present invention relates to an auto document feeder and a document reader arranged to read image information of a document while the auto document feeder is transporting the document.

2. Description of the Related Art

Conventionally, it is known that a document reader arranged to read image information of a document includes an auto document feeder. An auto document feeder is configured to separate stacked documents one by one to transport and guide each document to go through a position where image information of the document is read.

It is known that there are various configurations used in a document reader provided with an auto document feeder for reading both surfaces (a first surface and a second surface) of a document. For example, there is a configuration in which read units are included respectively for the first surface and for the second surface so as to read both surfaces through one-pass (one-pass type). In another example, there is a configuration in which a switch-back function is included to reverse a transport direction of the document (three-pass type). In addition to the above, there is another configuration in which a path for reversing front-back surfaces of the document is included and one read unit can read both surfaces of the document without using the switch-back function (two-pass type).

An auto document feeder of the two-pass type includes a lead path, a reverse path and an eject path. The lead path is an inverted U-shaped path which protrudes to one side and guides a document placed on a feed tray to a read position located below the feed tray. The document, which was guided to the read position and whose front page was read through the lead path, is then transported via the reverse path. The reverse path includes an inverted U-shaped path which protrudes to the other side and reverses the front-back surfaces of the document and guides the document back to the read position. The document, which was guided to the read position and whose second surface was read through the reverse path, is then transported via the eject path. The eject path, which includes a path which protrudes to the same direction (the one side) as the lead path, guides the document via a curve path smaller than the lead path to pass above the read position, and further guides the document above the reverse path to an eject tray.

In the above configuration, it is possible to read both surfaces of the document with one read unit without the switch-back function.

However, the configuration of the two-pass type which can read both surfaces of a document through a path that reverses the front-back surfaces of the document generally has longer paths than those of other configurations, i.e. the one-pass type provided with two read units and the three-pass type provided with the switchback function.

Accordingly, it is necessary to include many transport rollers and transmission members and, as a result, the production cost increases. Further, in this configuration, the paths tend to be complicated and the paths are sometimes placed on top of each other.

For example, the auto document feeder of the two path type, on the left side of the read position, is arranged with the lead path and the eject path on top of each other (in parallel) on the one side. As a result, the size of the auto document feeder in the horizontal direction would be enlarged. Further, if a path near the read position is considerably curved, it may reduce the accuracy of the reading. In order not to reduce the accuracy of the reading, the curvature of the lead path and the eject path needs to be increased to a certain degree. However, if the curvature is increased, the paths would protrude to the one side, therefore making it difficult to reduce the size of the auto document feeder in the horizontal direction.

SUMMARY OF THE INVENTION

In order to overcome the problems described above, preferred embodiments of the present invention provide an auto document feeder which includes a path to reverse the front-back surfaces of a document so as to read both surfaces of the document, and which is compact and can be produced at a low cost.

In a first preferred embodiment of the present invention, an auto document feeder includes a lead path, a reverse path and an eject path. The lead path guides a document supplied from one side of the read position to the other side thereof so as to read the first surface of the document. The reverse path, which is connected to the lead path, reverses the document whose front surface has been read, and guides the document from the other side of the read position to the one side thereof so as to read image information of the second surface of the document. The eject path, which is connected to the reverse path, guides the document whose image information of the second surface has been read, so as to eject the document further to the other side than the read position. The lead path includes a lead curve path which protrudes to the one side and is arranged further to the one side than the read position. The lead path and the eject path share a portion of their paths. A shared curve path, which is the shared portion between the lead path and the eject path, includes at least a portion between the read position and a portion which the lead curve path protrudes the most to the one side.

Accordingly, since the lead path and the eject path share some members in the configuration, the auto document feeder is low-cost. Further, since the lead path and the eject path are not arranged on top of each other in at least a portion of the lead curve path, the size of the auto document feeder in the direction in which the lead curve path protrudes can be reduced.

It is preferable that the auto document feeder has a configuration as described below. That is, the eject path preferably includes an eject curve path which protrudes to the one side and is arranged further to the one side than the read position. Further, the eject curve path is preferably shorter than the lead curve path.

Accordingly, since the shared curve path occupies a large part of the eject curve path, the auto document can be constructed at a lower cost.

It is preferable that the auto document feeder has a configuration as described below. That is, the auto document feeder preferably includes three barrel rollers provided with a driving roller and two driven rollers which rotate in conjunction with a rotation of the driving roller. The lead path, which is connected to the shared curve path, includes a lead dedicated path which is used only to introduce the document. The eject path, which is connected to the shared curve path, includes an eject dedicated path which is used only to eject the document. The three barrel rollers are arranged at a position which divides the shared curve path into the lead dedicated path and the eject dedicated path.

Accordingly, since the space available for the position that divides the path is limited, the three barrel rollers which can transport the document into two paths with one driving roller can be used effectively. Further, since the lead dedicated path and the eject dedicated path transport the document in opposite directions, it is preferable to use the three barrel rollers arranged such that the two driven rollers rotate in opposite directions to each other.

It is preferable that the auto document feeder has a configuration as described below. That is, the auto document feeder includes a flexible guide film arranged at the position which divides the shared curve path into the lead dedicated path and the eject dedicated path. The guide file guides the document such that the document does not enter into the lead dedicated path from the shared curve path.

Accordingly, a document transported via the shared curve path can be transported into correct directions with a simple configuration.

In another preferred embodiment of the present invention, it is possible to provide a document reader provided with the auto document feeder and a read unit arranged to read image information of a document which goes through the read position.

Accordingly, it is possible to provide a document feeder which is compact and low-cost.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Figure 1:
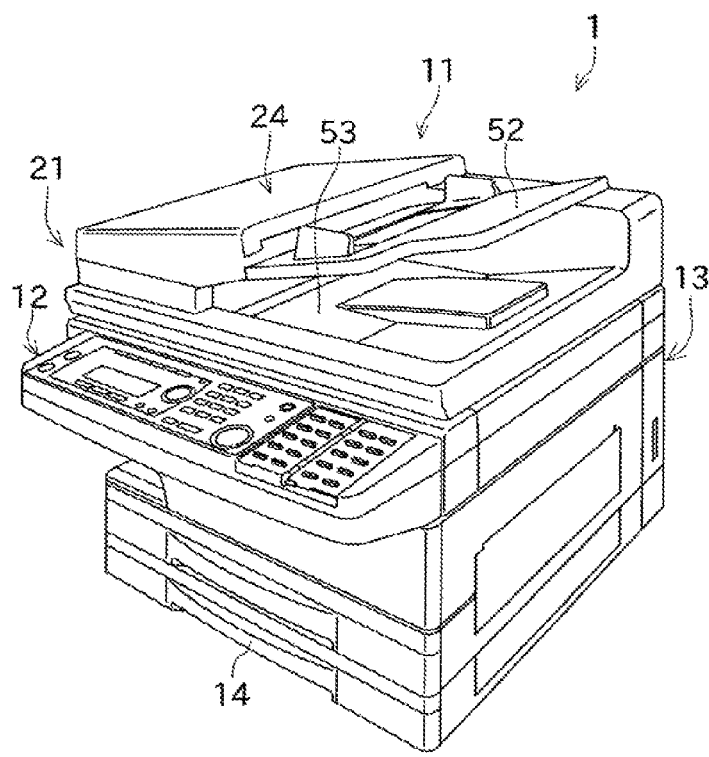
FIG. 1 is an external perspective view of a multi functional peripheral according to a preferred embodiment of the present invention.

Preferred embodiments of the present invention will be described with reference to the drawings. FIG. 1 is an external perspective view of a multi functional peripheral 1 according to a preferred embodiment of the present invention.

The multi functional peripheral 1 preferably includes a copy function and a facsimile function, and includes an image scanner (document reader) 11, which functions as a book scanner and an auto document feed scanner, arranged on the upper side of the multi functional peripheral 1. Further, the multi functional peripheral 1 includes an operation panel 12 arranged to set the number of copies, a destination of a facsimile transmission, a document reading and the like.

Further, the multi functional peripheral 1 includes a multi functional peripheral main body 13 including an image forming unit and the like arranged to form an image on paper, which is used as a recording medium, and a feed cassette 14 arranged to supply the paper in order. Further, the multi functional peripheral main body 13 includes a transmit-receive unit (not illustrated) and the like arranged to transmit image information via communication lines.

Figure 2:
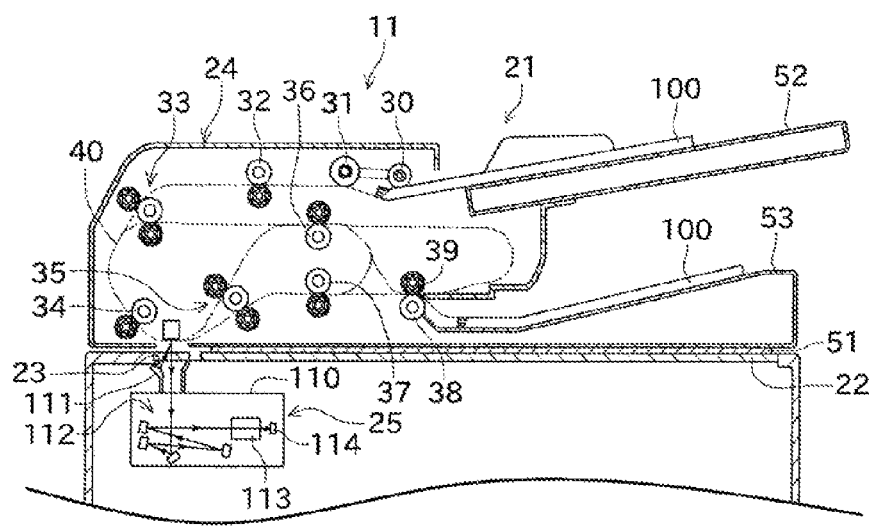
FIG. 2 is a front cross section view illustrating a configuration of an image scanner.

The image scanner 11 of the multi functional peripheral 1 will be described with reference to FIG. 2. FIG. 2 is a front cross section view illustrating a configuration of the image scanner 11. Further, the front view in this preferred embodiment can represent a view in a width direction of a document which is transported.

As illustrated in FIG. 2, the image scanner 11 includes a document table cover 21, a platen glass 22 and a contact glass 23. The document table cover 21 includes an auto document feeder (ADF) 24. Further, the image scanner 11 includes a scanner unit 25 which is arranged to read image information of a document 100 and arranged below the platen glass 22 and the contact glass 23.

The scanner unit 25 includes a carriage 110 movable in a horizontal direction inside a document table. The carriage 110 includes a light source 111, a plurality of reflective mirrors 112, a condenser lens 113 and a charge-coupled device (CCD) 114. The light source 111 irradiates light onto a document to be read. The light reflected by the document, after being reflected by the plurality of the reflective mirrors 112, goes through the condenser lens 113 and is focused thereby. The focused light then forms an image on a surface of the CCD 114. And then, the CCD 114 converts the reflected focused light into an electrical signal to be outputted.

Further, as illustrated in FIG. 2, the ADF 24 of the document table cover 21 includes a feed tray 52 located on the upper side of the document table cover 21 and an eject tray 53 located below the feed tray 52. Further, ADF 24 includes a document transport path 40 which connects the feed tray 52 and the eject tray 53.

When a user instructs the image scanner 11 to function as an auto document feed scanner through the operation panel 12, stacked documents 100 placed on the feed tray 52 are transported, one page at a time, via the document transport path 40. And when a document 100 transported via the document transport path 40 goes through a glass surface (read position) of the contact glass 23, image information of the document 100 is read by the scanner unit 25. And then, the document 100 is transported via the document transport path 40 and ejected to the eject tray 53.

When the user uses the image scanner 11 as a book scanner, the user places a book document to be read on the platen glass 22. And then, with a platen sheet 51 arranged at the bottom of the ADF 24, the user presses the book document from the above while holding it such that the book document does not move. While the book document is held, the scanner unit 25 moves in the horizontal direction so as to read image information of the book document.

Next, a configuration inside the ADF 24 will be described in details. Further, in the description below, the side of the feed tray 52 from the front view may be regarded simply as "right side", and the other side from the front view may be regarded simply as "left side".

Figure 3:
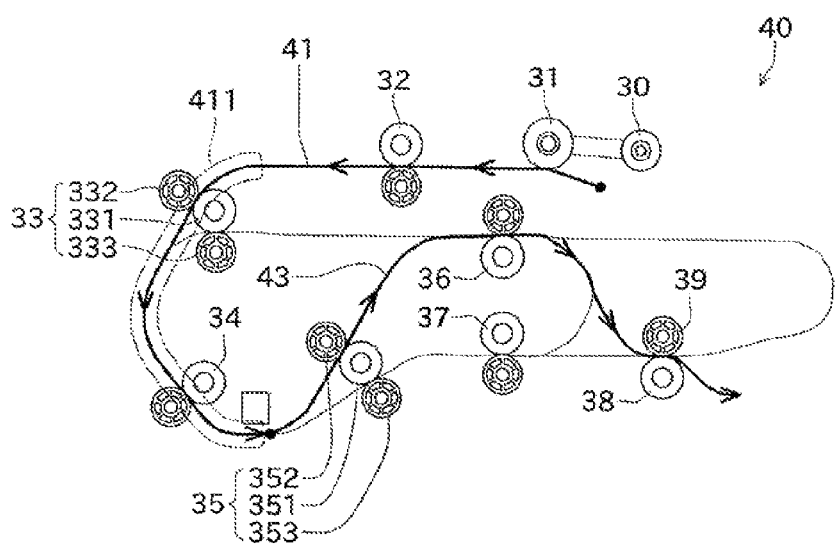
FIG. 3 is a diagram illustrating the lead path and a single surface eject path.

The ADF 24 in this preferred embodiment is configured to use different paths to transport the document 100 when reading a single surface (the first surface) of the document 100 and when reading both surfaces (the first surface and the second surface) thereof. At first, the path when reading only a single surface of the document 100, and members arranged along the path, will be described with reference to FIG. 2 and FIG. 3. FIG. 3 is a figure illustrating a lead path 41 and a single surface eject path 43.

As illustrated in FIG. 3, when reading only a single surface of the document 100, the document 100 is transported via the lead path 41 arranged to guide the document 100 to the read position and the single surface eject path 43 arranged to guide the document 100 from the read position to the eject tray 53.

The lead path 41 includes, starting from the upstream, a pick-up roller 30, a separate roller 31, a registration roller 32, three barrel rollers 33 and a transport roller 34. Next, a configuration of each member arranged along the lead path 41 will be described in the order from the upstream to the downstream.

The pick-up roller 30 and the separate roller 31 are arranged near the end of the upstream of the lead path 41. The pick-up roller 30 is arranged to be rotatable on an axis of the separate roller 31 and is being held at a higher position than that shown in the FIG. 2 when the ADF 24 is not in operation. By contrast, when feeding the documents 100, the pick-up roller 30 rotates downward and makes contact with the end part of the top layer of the stacked documents 100 placed on the feed tray 52. And then, when the pick-up roller 30 turns under this condition, the document 100 of the top layer on the feed tray 52 is transported to the separate roller 31.

The documents 100, which have been transported to the separate roller 31 by the drive of the pick-up roller 30, are separated one by one by the separate roller 31. And then, each separated document 100 is transported to the registration roller 32 located in the downstream.

The registration roller 32, with an opposed roller, briefly holds the end portion of the document 100 which is being transported so as to slag the document 100, and transports the document to the downstream while removing the slag after a predetermined time. In this way, skew of the document 100 is adjusted. The document 100 which has gone through the registration roller 32 is transported to the three barrel rollers 33 located in the downstream.

Further, the section of the lead path 41 between the separate roller 31 and the slightly upstream of the three barrel rollers 33 is a straight path.

The three barrel rollers 33 include a driving roller 331 arranged in the middle and driven rollers 332 and 333 arranged one above the other with the driving roller 331 held in between. The document 100 which is transported via the lead path 41 passes between the driving roller 331 and the driven roller 332 placed thereon to be transported diagonally downward towards the left size. The document 100 which has traveled through the three barrel rollers 33 is transported to the transport roller 34 located in a downstream portion. Further, since the driven roller 333 placed under the driving roller 331 rotates in an opposite direction to the driven roller 332, the driven roller 333 can transport the document 100 that travels between the driving roller 331 and the driven roller 333, to the right side.

The transport roller 34 transports the document 100 diagonally downward towards the right side (the side of the read position) by rotating while nipping the document 100 with an opposed roller. And, the scanner unit 25 reads image information of the first surface of the document 100 when the document 100 goes through the read position. Further, the transport roller 34 is arranged to have switchable directions of its rotation. Therefore, by rotating in the opposite direction, the transport roller 34 can transport the document 100 diagonally upward towards left (the side of the three barrel rollers 33).

Further, the section of the lead path 41 between the slightly upstream of the three barrel rollers 33 and the read position protrudes to the left side (a convex curve to the left side) (lead curve path 411 illustrated in FIG. 3).

Next, the single surface eject path 43 will be described. The single surface eject path 43 includes, starting from the upstream, three barrel rollers 35, a transport roller 36, a shared roller 38 and an opposed roller 39. A configuration of each member arranged along the single surface eject path 43 will be described in the order from the upstream to the downstream.

There is a dividing position at the slightly downstream portion of the read position, which divides a path into an upper path and a lower path, and the three barrel rollers 35 are arranged near the dividing position. The three barrel rollers 35 include a registration roller 351 arranged in the middle and driven rollers 352 and 353 arranged one above the other with the registration roller 351 held in between. The document 100, whose image information has been read by the scanner unit 25, travels between the registration roller 351 and the driven roller 352 placed thereon to be transported diagonally upward towards the right side. The document 100, which has gone trough the three barrel rollers 35, goes through the transport roller 36 located in the downstream so as to be transported to the shared roller 38 located diagonally downward to the right of the transport roller 36. Further, the registration roller 351 has the same configuration as the registration roller 32 and can adjust the skew of the document 100 which travels between the registration roller 351 and the driven roller 353 placed thereunder to be transported diagonally downward towards the left side.

The shared roller 38, with the opposed roller 39 placed oppositely, transports the document 100 to the right side so as to eject the document 100 to the eject tray 53 by rotating while nipping the document 100. As described above, image information of only a single surface of the document 100 placed on the feed tray 52 was read. Further, the shared roller 38 is arranged to have switchable directions of its rotation. Therefore, the shared roller 38 can transport the document 100 to the left side (the side of read position) by rotating in the opposite direction to the direction when ejecting the document 100.

Figure 4:
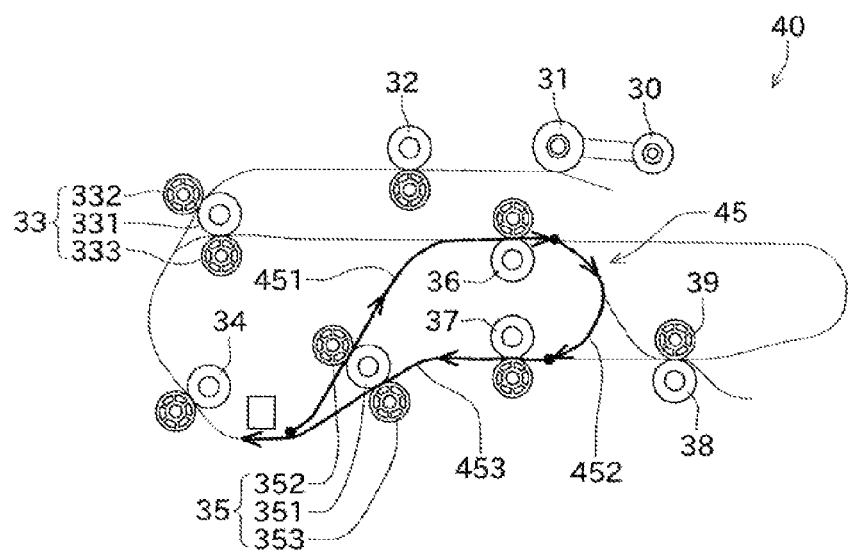
FIG. 4 is a diagram illustrating a first reverse path.
Figure 5:
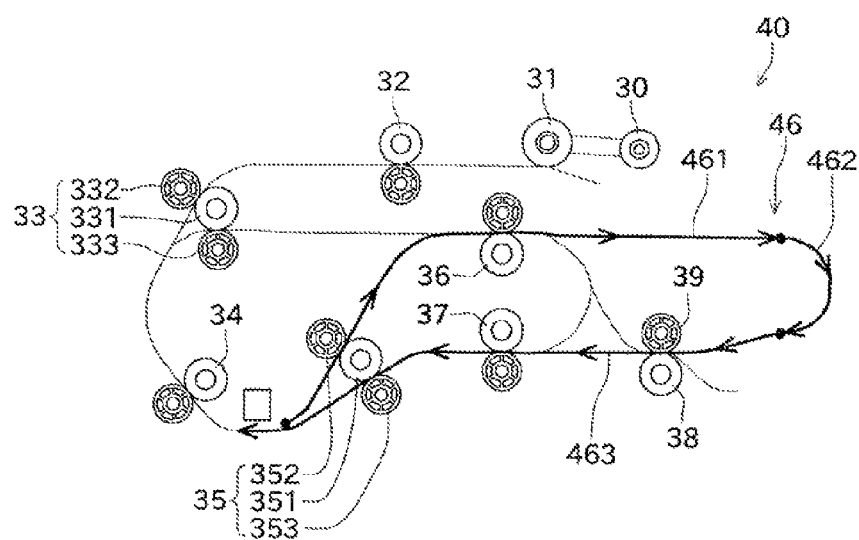
FIG. 5 is a diagram illustrating a second reverse path.
Figure 6:
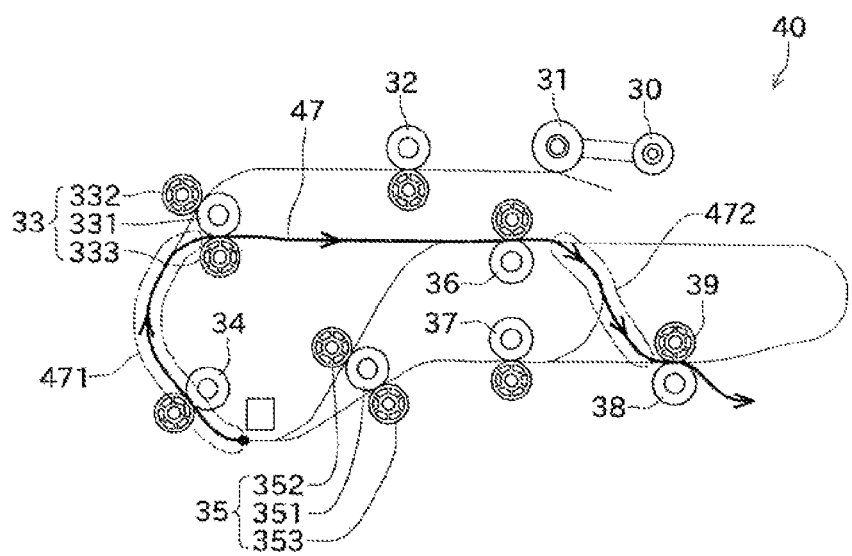
FIG. 6 is a diagram illustrating a both surfaces eject path.

A path for reading both surfaces of the document 100 will be described with reference to FIG. 2 and FIG. 4 through FIG. 6. FIG. 4 is a figure illustrating a first reverse path 45. FIG. 5 is a figure illustrating a second reverse path 46. FIG. 6 is a figure illustrating a both surfaces eject path 47.

In the same way as reading a single surface of the document 100, when reading both surfaces of the document 100 placed on the feed tray 52, the document 100 is transported via the lead path 41 to the read position. And image information of the first surface of the document 100 is read by the scanner unit 25. Further, the ADF 24 in this preferred embodiment is configured to detect the length of the document 100 in the transport direction and to, based on the detected length of the document 100, switch to a path along which the document 100 is transported after the lead path 41 via a path guide (not illustrated) and the like.

At first, a path along which the document 100 is transported when the length of the document 100 is short will be described. In this case, the document 100 is arranged to be transported via the first reverse path (reverse path) 45 illustrated in FIG. 4 after transported to the read position via the lead path 41. The first reverse path 45 includes, starting from the upstream, a first before-reverse path 451, a first mid-reverse path 452, and a first after-reverse path 453.

The first before-reverse path 451 includes, starting from the upstream, the three barrel rollers 35 and the transport roller 36. The document 100 which is transported via the first before-reverse path 451, in the same way as in the single surface eject path 43, travels between the registration roller 351 and the driven roller 352 placed thereon so as to be transported diagonally upward towards right. And, the document 100 is transported through the transport roller 36 to the right side and to the first mid-reverse path 452.

The first mid-reverse path 452 guides the document 100 diagonally and partly downward towards right, in the same way as the single surface eject path 43. However, after passing a dividing position on the way, the first mid-reverse path 452 guides the document 100 so as to transport the document 100 diagonally downward towards left. The first mid-reverse path 452 expands to the right side (a convex curve to the right side). The transportation of the document 100 via the first mid-reverse path 452 allows the front-back surfaces of the document 100 to be reversed. That is, the first surface which faced down (to the side of the scanner unit 25) before being transported via the first mid-reverse path 452 faces up after being transported via the first mid-reverse path 452. And, the document 100 which has been transported via the first mid-reverse path 452 is then transported to the first after-reverse path 453.

The first after-reverse path 453 includes, starting from the upstream, a transport roller 37 and the three barrel rollers 35. The document 100 which is transported via the first after-reverse path 453 is transported through the transport roller 37 to the left side, and goes through the read position after the skew is adjusted by the registration roller 351 of the three barrel rollers 35. The above is the description of the reverse of the document 100 having a relatively short length.

Next, a path that reverses the document 100 when the length of the document 100 is relatively long will be described. Here, that the length of the document is relative long means that the length of the document is as long as or longer than the first reverse path 45. If the document 100 with the long length is transported via the first reverse path 45, the back end of the document 100 would be still at the read position when the front end thereof tries to go through the read position. As a result, the document 100 overlaps and causes a paper jam. Therefore, as illustrated in FIG. 5, the second reverse path (reverse path) 46, along which the document 100 with the long length is transported, is configured to be longer than the first reverse path 45.

The second reverse path 46 includes a second before-reverse path 461, a second mid-reverse path 462, and a second after-reverse path 463. The second before-reverse path 461 extends to the right side beyond the first before-reverse path 451. The second mid-reverse path 462 includes, in the same way as the first mid-reverse path 452, a path which protrudes to the right side (a convex curve to the right side). The second after-reverse path 463 extends to the right side beyond the first after-reverse path 453.

Further, the document 100 goes through the shared roller 38 when the second after-reverse path 463 transports the document 100 to the left side. As described above, since the shared roller 38 is arranged to have switchable directions of its rotation, the document 100 can be transported to the left side. Thus, the shared roller 38 is arranged to function as the eject roller and also as the transport roller. As described above, the document 100 having the long length is reversed through the above described arrangement.

And the document 100, which has been reversed through the first reverse path 45 or the second reverse path 46 and whose image information of the second surface has been read, is transported via the both surfaces eject path (eject path) 47 illustrated in FIG. 6.

The document 100, which is transported via the both surfaces eject path 47, goes through the read position to the left so as to be transported diagonally upward towards left through the transport roller 34. Then the document 100 travels between the driving roller 331 and the driven roller 333 placed thereunder to be transported to the right side.

Further, the section of the both surfaces eject path 47 between the read position and the three barrel rollers 33 protrudes to the left side (a convex curve to the left side) (the eject curve path 471 illustrated in FIG. 6). And the transport direction of the document 100 transported via the lead curve path 411 is opposite to that of the document 100 transported via the eject curve path 471. With respect to this point, the transport roller 34 of the present preferred embodiment is arranged to have switchable directions of its rotation, and the driven roller 332 and the driven roller 333 rotate in opposite directions. Therefore, the transport roller 34 can respond to the above-described bidirectional transportation.

The document 100, which has been transported via the both surfaces eject path 47 and has gone through three barrel rollers 33, goes to the right side so as to be transported diagonally downward towards right after going through the transport roller 36. The document 100, in the same way as the document 100 transported via the single surface eject path 43, is ejected to the eject tray 53 through the shared roller 38 and the opposed roller 39. Further, the section of the both surfaces eject path 47 between the dividing position located slightly downstream of the transport roller 36 and the dividing position located slightly upstream of the shared roller connects the second before-reverse path 461 and the second after-reverse path 463 (a connect path 472 illustrated in FIG. 6). As described above, the image information of both surfaces of the document 100 placed on the feed tray 52 has been read.

Figure 7:
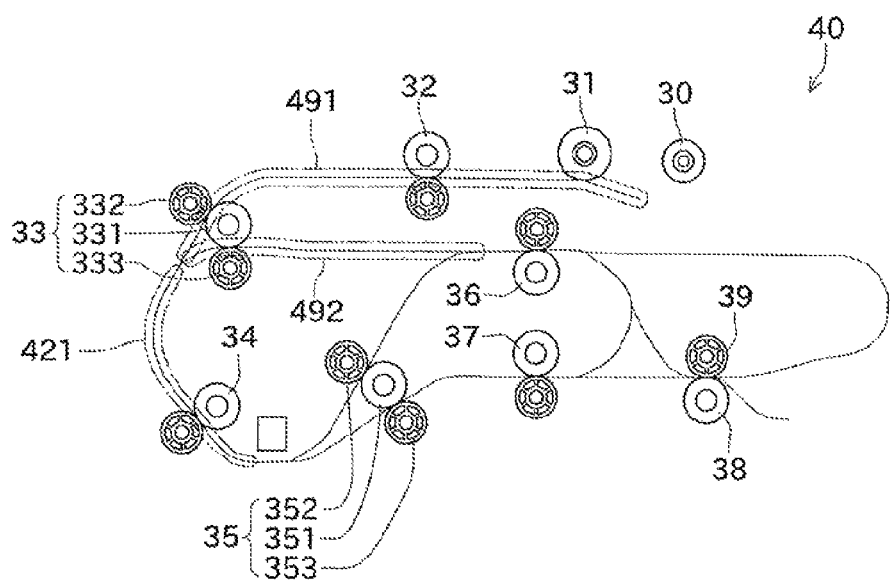
FIG. 7 is a diagram illustrating the shared curve path.

A portion shared by the lead path 41 and the both surfaces eject path 47 will be described mainly with reference to FIG. 7. FIG. 7 is a figure illustrating a shared curve path 421.

As is clear from FIG. 3 and FIG. 6, the lead path 41 and the both surfaces eject path 47 share a portion of their paths (the shared curve path 421 illustrated in FIG. 7). As illustrated in FIG. 7, the shared curve path 421 is the path extending from the read position, through the portion in which the lead curve path 411 protrudes the most to the left side, to a dividing position located before the three barrel rollers 33. The dividing position, as illustrated in FIG. 7, divides the shared curve path 421 into a lead dedicated path 491 and an eject dedicated path 492. The lead dedicated path 491 is the portion of the lead path 41 used only to introduce the document 100. The eject dedicated path 492 is the portion of the both surfaces eject path 47 used only to eject the document 100. Further, the shared curve path 421 can also be described as a path shared between the lead curve path 411 and the eject curve path 471.

Figure 8A:
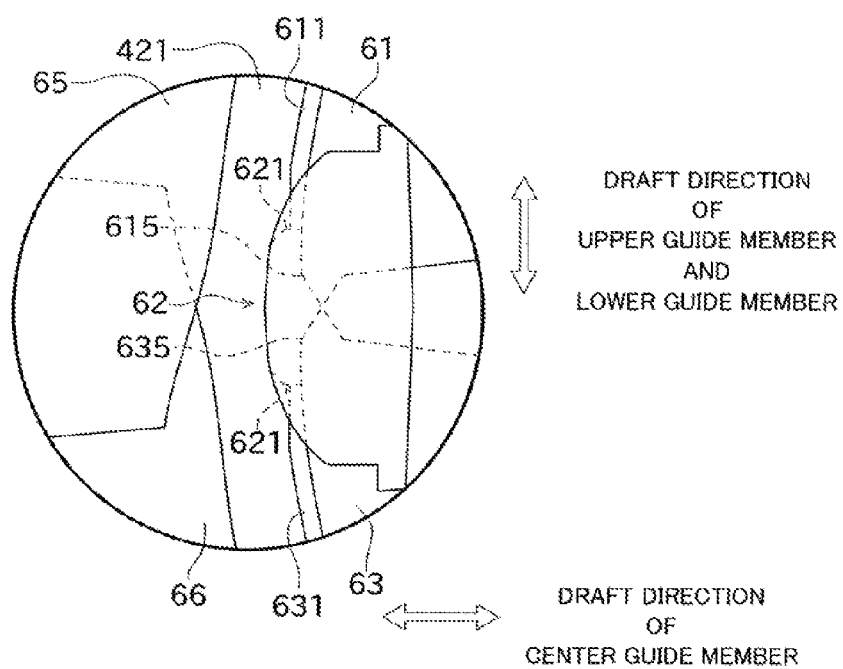
FIGS. 8A and 8B are front enlarged views illustrating members arranged to guide a document transported via the shared curve path and a parting line which is formed in the members.
Figure 8B:
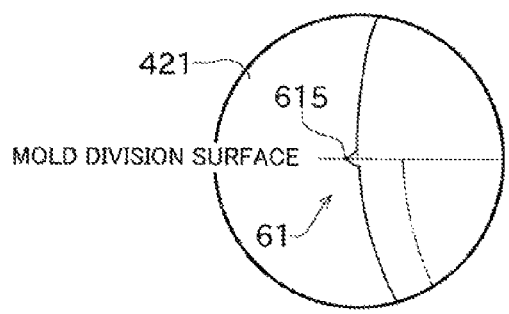
Figure 9:
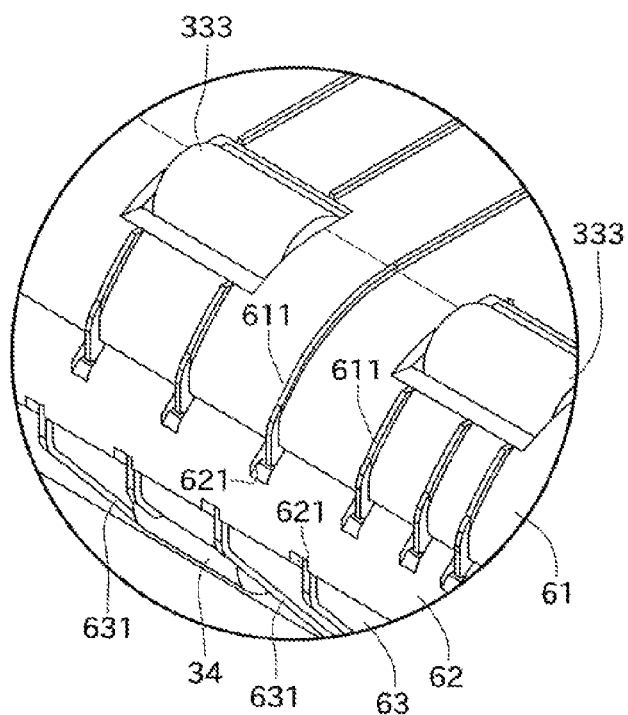
FIG. 9 is a perspective view illustrating members arranged to guide the document transported via the shared curve path.

Next, a configuration for guiding the document 100 transported via the shared curve path 421 will be described with reference to FIGS. 8A and 8B and FIG. 9. FIGS. 8A and 8B are front enlarged views illustrating members arranged to guide the document 100 transported via the shared curve path 421, and a parting line 615 provided in the members. FIG. 9 is a perspective view illustrating the members arranged to guide the document 100 transported via the shared curve path 421.

As illustrated in FIG. 8A, outside guide members 65 and 66 are arranged on the left side (outside) of the shared curve path 421 for guiding the document 100. The outside guide members 65 and 66 each include protrusions and grooves, and are arranged to be partly engaged since the protrusions of one outside guide member fit into the grooves of the other outside guide member.

Further, as illustrated in FIG. 8A and FIG. 9, an upper guide member 61, a center guide member 62, and a lower guide member 63 are arranged to be engaged on the right side (inside) of the shared curve path 421 to guide the document 100. Further, the upper guide member 61 and the lower guide member 63 are not necessarily arranged to be engaged, and the upper guide member 61 and the lower guide member 63 may be arranged away from each other.

The upper guide member 61 and the lower guide member 63 are preferably made of synthetic resins and arranged to guide the document 100 transported above and below the center guide member 62. The upper guide member 61 and the lower guide member 63 each preferably include protrusions and grooves (not illustrated) at their contacting positions, and are arranged to be engaged since the protrusions of one go into the grooves of the other, thereby preventing damages and jams of the document 100 and the like.

Further, the upper guide member 61 and the lower guide member 63 are molded with a mold, and the draft direction of the mold is vertical. Therefore, a large portion of parting lines 615 and 635 of the upper guide member 61 and the lower guide member 63 is parallel or substantially parallel to the width direction of the shared curve path 421.

FIG. 8B illustrates an example of the parting line 615 of the upper guide member 61. As illustrated in FIG. 8B, protrusions such as burrs may be formed on the parting line 615 during the molding process. When the document 100 is caught by the protrusions, damages and jams of the document 100 may occur. Meanwhile, any operation for removing the burrs and the like on the parting line 615, for the entire shared curve path 421 in the width direction, would result in an increased production cost.

Further, as illustrated with a dashed and dotted line in FIG. 8B, if the upper guide member 61 is molded so as to form a level difference along the parting line 615, it would result in a decreased chance of interference against the document transportation due to the protrusions. However, the shared curve path 421 transports the document 100 bi-directionally. Therefore, in whichever direction the level difference is formed, the document 100 would be caught by the level difference when the document 100 is transported either upward or downward. For example, as illustrated in FIG. 8B, if the level difference is formed along the dashed line, the front end of the document may be caught by the level difference when the document 100 is transported upward from the lower side.

With respect to this point, according to this preferred embodiment, the center guide member 62 is arranged as to cover the upper guide member 61 and the lower guide member 63. The center guide member 62 is preferably made of synthetic resins and arranged to guide the document 100 transported near the portion in which the shared curve path 421 protrudes the most to the left. The center guide member 62 is arranged to extend beyond the parting lines 615 and 635 of the upper guide member 61 and the lower guide member 63, towards the side of the shared curve path 421 (left side). Since the center guide member 62 prevents the document 100 from making contact with the parting lines 615 and 635 of the upper guide member 61 and the lower guide member 63, it enables a configuration in which the document 100 can be transported both upward and downward without being caught.

Further, the center guide member 62 is preferably molded with a mold too, and the draft direction of the mold is set as a horizontal direction, as illustrated in FIG. 8A, and the parting line (not illustrated) is arranged on the inner side of the shared curve path 421. That is, it defines a layout in which the parting line of the center guide member 62 never extends to the side of the shared curve path beyond the upper guide member 61 and the lower guide member 63, thereby preventing the document 100 from being caught on the parting line of the center guide member 62.

A plurality of grooves 621 is provided on the upper side of the center guide member 62. By contrast, the upper guide member 61 includes ribs 611 which protrude to the side of the shared curve path 421. The gap between the ribs 611 is the same as that between the grooves 621, and the ribs 611 go into the upper side of the grooves 621. Accordingly, the upper side guide member 61 and the center side guide member 62 are arranged to be engaged partly. Further, in the same way, the center guide member 62 includes grooves 621 on the lower side thereof. Since ribs 631 of the lower guide member 63 fit into the groove 621, the lower guide member 63 and the center guide member 62 are arranged to be engaged partly.

Figure 10:
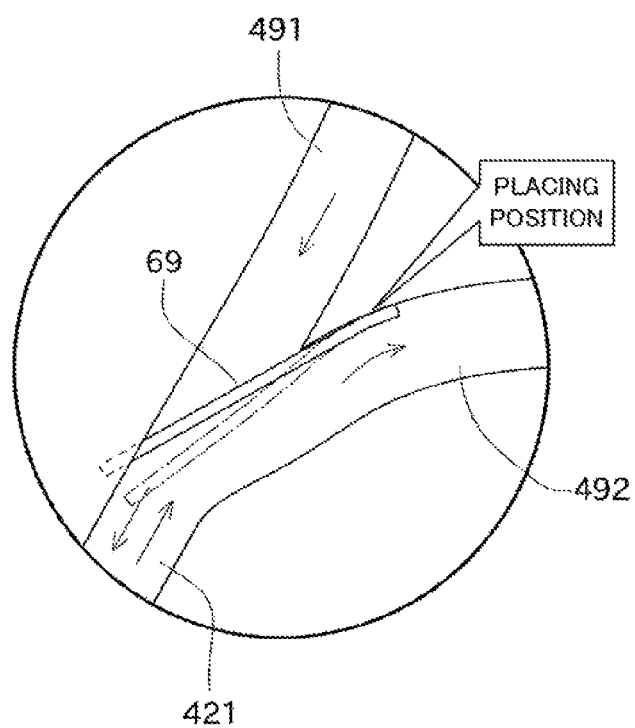
FIG. 10 is a front enlarged view illustrating a configuration of the guide film.

Next, a configuration for guiding the document 100 correctly at the position which divides the shared curve path 421 into the lead dedicated path 491 and the eject dedicated path 492 will be described with reference to FIG. 10. FIG. 10 is a front enlarged view illustrating a configuration of a guide film 69.

The guide film 69, which is flexible, is arranged at the dividing position. More specifically, as illustrated in FIG. 10, the end portion of the guide film 69 is arranged on a member on the upper side of the eject dedicated path 492.

The guide film 69 is usually at the position illustrated with a solid line in FIG. 10. Accordingly, even when the document 100 transported diagonally upward towards right via the shared curve path 421 hits the guide film 69, the document 100 is transported along the guide film 69. As a result, it is possible to prevent the document 100 from going into the lead dedicated path 491. By contrast, since the document 100 transported diagonally downward towards left via the lead dedicated path 491 can push the guide film 69 to the position illustrated with a two-dot chain line in FIG. 10, the document 100 can be led to the shared curve path 421.

As described above, the ADF 24 of the present preferred embodiment includes the lead path 41, the first reverse path 45, the second reverse path 46, and the both surfaces eject path 47. The lead path 41 is arranged to guide the document 100 from the left side of the read position to the right side thereof so as to read the first surface of the supplied document 100. The first reverse path 45 and the second reverse path 46 are connected to the lead path 41 and arranged to reverse the document 100 whose first surface has been read, and guide the document 100 from the right side of the read position to the left side thereof so as to read image information of the second surface of the document 100. The both surfaces eject path 47 is connected to the first reverse path 45 and the second reverse path 46, and arranged to guide the document 100 whose image information of the second surface has been read so as to eject the document 100 further to the right side than the read position. Further, the lead path 41 includes the lead curve path 411 which protrudes to the left side and is located more to the left side than the read position. The lead path 41 and the both surfaces eject path 47 partly shares a portion of their paths. The shared curve path 421, which is the shared portion, includes at least the portion between the read position and the portion in which the lead curve path 411 protrudes the most.

Accordingly, since the lead path 41 and the both surfaces eject path 47 share members which guide the document 100 transported via the shared curve path 421, the transport roller 34, and the driving transmission members, the ADF 24 can be constructed at a low cost. Further, since the lead path 41 and the both surfaces eject path 47 are not arranged on top of each other (in parallel) at least partly along the lead curve path 411, it is possible to reduce the size of the ADF 24 in the width direction (left-right direction).

Further, in the ADF 24 in this preferred embodiment, the both surfaces eject path 47 includes the eject curve path 471 which protrudes to the left side and is arranged further to the left side than the read position. Furthermore, the eject curve path 471 is shorter than the lead curve path 411.

Accordingly, since the shared curve path 421 occupies a large portion of the eject curve path 471, it is possible to construct the ADF 24 at a lower cost.

Further, the ADF 24 in this preferred embodiment includes the three barrel rollers 33 provided with the driving roller 331 and the driven rollers 332 and 333 which rotate in conjunction with a rotation of the driving roller 331. The three barrel rollers 33 are arranged at the position which divides the shared curve path 421 into the lead dedicated path 491 and the eject dedicated path 492.

Accordingly, since the space available for the dividing position is limited, the three barrel rollers 33 which can transport the document 100 to two paths with only one driving roller 331 can be used effectively. Further, since the transport direction of the document 100 in the lead dedicated path 491 and that in the eject dedicated path 492 are opposite to each other, it is preferable to use the three barrel rollers 33 arranged such that the two driven rollers 332 and 333 rotate in opposite directions to each other.

Further, the ADF 24 in this preferred embodiment includes the guide film 69, which is flexible, arranged at the position which divides the shared curve path 421 into the lead dedicated path 491 and the eject dedicated path 492. The guide film 69 guides the document 100 such that the document 100 does not enter into the lead dedicated path 491 from the shared curve path 421.

Accordingly, it is possible to guide the document 100 transported via the shared curve path 421 into correct directions with a simple configuration.

While the present invention has been described with respect to preferred embodiments thereof, the above described configuration can be modified in ways described below.

According to the above described preferred embodiment, the upper guide member 61, the center guide member 62, and the lower guide member 63 are preferably arranged on the inner side of the lead curve path 411. However, the guide members may be placed along any path, as long as the path transports a document bi-directionally and is a curve path, and is not limited to the inside of the lead curve path 411.

According to the above preferred embodiment, the center guide member 62 preferably includes the grooves 621. However, the configuration can be changed to one in which the center guide member 62 includes ribs instead, and the upper guide member 61 and the lower guide member 63 includes grooves which the ribs can go into.

According to the above preferred embodiment, the scanner unit 25, which has a reduction optical system, is preferably used as a read unit. However, the configuration can be changed to one in which a contact image sensor or the like is used instead.

According to the above preferred embodiment, the image scanner 11 is preferably used as a part of the multi functional peripheral 1. However, the configuration can be changed to one in which the image scanner 11 is used simply as an image scanner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An auto document feeder comprising:
 a lead path arranged to guide a document supplied from a first side of a read position to a second side thereof so as to read a first surface of the document;
 a reverse path connected to the lead path and arranged to reverse the document whose image information of the first surface has been read, and to guide the document from the second side of the read position to the first side thereof so as to read a second surface of the document; and
 an eject path connected to the reverse path and arranged to guide the document whose image information of the second surface has been read, so as to eject the document further to the second side than the read position; wherein
 the lead path includes a lead curve path which protrudes to the first side and is arranged further to the first side than the read position;
 the lead path and the eject path share a portion of their paths including a shared curve path;
 the shared curve path includes at least a portion that extends between the read position and a portion of the lead curve path that protrudes furthest to the first side such that the shared curve path includes the portion of the lead curve path that protrudes furthest to the first side;
 a transport roller arranged to have switchable directions of rotation is provided on the shared curve path; and
 the transport roller rotates in one direction when guiding the document from the shared curve path to the read position and rotates in the other direction when guiding the document from the read position to the shared curve path.

2. The auto document feeder according to claim 1, wherein the eject path includes an eject curve path which protrudes to the first side and is arranged further to the first side than the read position; and
 the eject curve path is shorter than the lead curve path.

3. The auto document feeder according to claim 1, further comprising:
 three barrel rollers including;
 a driving roller; and
 two driven rollers which rotate in conjunction with a rotation of the driving roller; wherein
 the lead path includes a lead dedicated path which is connected to the shared curve path and is used only to introduce the document;
 the eject path includes an eject dedicated path which is connected to the shared curve path and is used only to eject the document; and
 the three barrel rollers are arranged at a position which divides the shared curve path into the lead dedicated path and the eject dedicated path.

4. The auto document feeder according to claim 3, wherein the two driven rollers rotate in opposite directions to each other.

5. The auto document feeder according to claim 1, wherein the lead path includes a lead dedicated path which is connected to the shared curve path and is used only to introduce the document;
the eject path includes an eject dedicated path which is connected to the shared curve path and is used only to eject the document;
further comprising a flexible guide film arranged at a position which divides the shared curve path into the lead dedicated path and the eject dedicated path; and
the guide film is arranged to guide the document such that the document does not enter into the lead dedicated path from the shared curve path.

6. The auto document feeder according to claim 1, wherein a path used to introduce the document when reading only a single surface of the document includes the lead path and a single surface eject path which guides the document from the read position to an eject tray.

7. The auto document feeder according to claim 6, further comprising:
three barrel rollers including:
a driving roller; and
two driven rollers which rotate in conjunction with a rotation of the driving roller; wherein
the three barrel rollers, which are provided along the single surface eject path, are arranged on the second side of the read position.

8. The auto document feeder according to claim 7, wherein the driving roller of the three barrel rollers is a registration roller.

9. The auto document feeder according to claim 1, further comprising:
a pick-up roller; and
a separate roller; wherein
both the pick-up roller and the separate roller are arranged near the end of the upstream of the lead path.

10. The auto document feeder according to claim 9, further comprising:
a registration roller arranged on the downstream of the separate roller.

11. The auto document feeder according to claim 1, wherein
the reverse path includes:
a first reverse path arranged to guide the document when the length of the document is relatively short; and
a second reverse path arranged to guide the document when the length of the document is relatively long.

12. The auto document feeder according to claim 11, wherein the first reverse path includes a first mid-reverse path, which protrudes to the second side and is arranged further to the second side than the read position; and
the second reverse path includes a second mid-reverse path, which protrudes to the second side beyond the first mid-reverse path and is arranged further to the second side than the read position.

13. The auto document feeder according to claim 12, wherein a portion of the first mid-reverse path is shared with a single surface eject path, which guides the document from the read position to an eject tray when reading only a single surface of the document.

14. The auto document feeder according to claim 11, wherein the first reverse path includes:
a first before-reverse path;
a first mid-reverse path; and
a first after-reverse path;
the second reverse path includes:
a second before-reverse path;
a second mid-reverse path; and
a second after-reverse path;
the second before-reverse path includes the first before-reverse path and extends to the second side beyond the first before-reverse path; and
the second after-reverse path includes the first after-reverse path and extends to the second side beyond the first after-reverse path.

15. The auto document feeder according to claim 1, further comprising:
a shared roller on the reverse path, arranged to have switchable directions of rotation; wherein
the shared roller rotates in one direction when ejecting the document and rotates in the other direction when reversing the document and introducing the document to the read position.

16. The auto document feeder according to claim 1, further comprising:
a pair of outside guide members partly engaged and arranged on the outer side of the shared curve path.

17. The auto document feeder according to claim 1, further comprising:
a center guide member arranged near the portion in which the shared curve path protrudes the most on the inner side of the shared curve path;
a upper guide member engaged partly with the center guide member on the inner side of the shared curve path; and
a lower guide member engaged partly with the center guide member on the inner side of the shared curve path.

18. The auto document feeder according to claim 17, wherein the center guide member is arranged to extend to the first side beyond parting lines of the upper guide member and the lower guide member.

19. A document reader comprising:
the auto document feeder according to claim 1; and
a read unit arranged to read image information of a document which goes through the read position.

* * * * *